US007138345B2

(12) United States Patent
Wadahara et al.

(10) Patent No.: US 7,138,345 B2
(45) Date of Patent: Nov. 21, 2006

(54) CARBON FIBER REINFORCED BASE MATERIAL, PREFORM AND COMPOSITE MATERIAL COMPRISING THE SAME

(75) Inventors: Eisuke Wadahara, Ehime (JP); Akira Nishimura, Kyoto (JP); Ikuo Horibe, Matsuyama (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/482,498

(22) PCT Filed: Jul. 2, 2002

(86) PCT No.: PCT/JP02/06696

§ 371 (c)(1),
(2), (4) Date: Dec. 31, 2003

(87) PCT Pub. No.: WO03/004758

PCT Pub. Date: Jan. 16, 2003

(65) Prior Publication Data

US 2004/0170554 A1  Sep. 2, 2004

(30) Foreign Application Priority Data

Jul. 4, 2001 (JP) ............................. 2001-203263
Apr. 26, 2002 (JP) ............................. 2002-126065

(51) Int. Cl.
*B32B 27/04* (2006.01)
*B32B 3/10* (2006.01)

(52) U.S. Cl. .................. 442/179; 442/64; 442/71; 442/72; 442/73; 442/74; 442/75; 442/76; 428/195.1; 423/447.1; 423/447.2

(58) Field of Classification Search ............ 442/64, 442/71, 72, 73, 74, 75, 76, 179; 423/447.1, 423/447.2; 428/195.1

See application file for complete search history.

(56) References Cited

U.S. PATENT DOCUMENTS 4,496,671 A * 1/1985 Yoshinaga et al. .......... 523/206
4,735,693 A * 4/1988 Asai et al. .................... 205/83

(Continued)

FOREIGN PATENT DOCUMENTS

EP     96/38280 A    12/1996

(Continued)

OTHER PUBLICATIONS

"Tackifier/Binder Toughened Resin Transfer Molding Composites," Hillermeier et al., *Journal of Advanced Materials*, vol. 32, No. 3, Jul. 2000, pp. 27-34.

(Continued)

*Primary Examiner*—Andrew T. Piziali
(74) *Attorney, Agent, or Firm*—DLA Piper US LLP

(57) ABSTRACT

A carbon fiber reinforced substrate comprising a fabric composed of carbon fiber bundles and a first resin adhering to the fabric. Each of the carbon fiber bundles comprises numerous continuous carbon filaments, has the tensile modulus of 210 GPa or more, and has the fracture strain energy of 40 MJ/m³ or more. The amount of the first resin adhering to the fabric is in a range from 1 to 20 parts by weight per 100 parts by weight of said fabric. A preform comprising a laminate composed of plural layers of the carbon fiber reinforced substrate, wherein the layers are integrated by means of the first resin. A composite comprising the preform impregnated with a matrix resin.

18 Claims, 6 Drawing Sheets

U.S. PATENT DOCUMENTS

| | | | |
|---|---|---|---|
| 4,906,506 A * | 3/1990 | Nishimura et al. | 428/113 |
| 4,992,228 A | 2/1991 | Heck et al. | |
| 5,071,711 A | 12/1991 | Heck et al. | |
| 5,176,949 A | 1/1993 | Allagnat et al. | |
| 5,217,766 A | 6/1993 | Flonc et al. | |
| 5,223,584 A * | 6/1993 | Lenke et al. | 525/405 |
| 5,279,893 A * | 1/1994 | Hattori et al. | 428/300.4 |
| 5,396,932 A * | 3/1995 | Homma et al. | 139/420 A |
| 5,487,512 A * | 1/1996 | Nojiri et al. | 242/471 |
| 5,648,027 A * | 7/1997 | Tajiri et al. | 264/43 |
| 5,985,431 A * | 11/1999 | Oosedo et al. | 428/297.4 |
| 6,030,575 A * | 2/2000 | Barron et al. | 264/517 |
| 6,063,839 A * | 5/2000 | Oosedo et al. | 523/206 |
| 6,228,474 B1 * | 5/2001 | Kishi et al. | 428/297.4 |

FOREIGN PATENT DOCUMENTS

| | | |
|---|---|---|
| JP | 8-300526 A | 11/1996 |
| JP | 8-337666 A | 12/1996 |
| JP | 9-177333 A | 7/1997 |
| JP | WO 97/31052 * | 8/1997 |

OTHER PUBLICATIONS

"Interlayer Toughening of Resin Transfer Molding Composites," Hillenmeier et al., *Composites: Part A*, vol. 32, 2001, pp. 721-729, (no month).

* cited by examiner

CARBON FIBER REINFORCED BASE MATERIAL, PREFORM AND COMPOSITE MATERIAL COMPRISING THE SAME

This application is a 371 of PCT/JP02/06696 filed Jul. 2, 2002.

TECHNICAL FIELD

The present invention relates to a carbon fiber reinforced substrate, a preform comprising the substrate, and a composite comprising the preform.

The present invention relates to a carbon fiber reinforced substrate having excellent handling properties at forming a preform from the carbon fiber reinforced substrate. The handling properties mean at least any one property selected from the stiffness, form stability, drapability and tackiness in lamination, of the carbon fiber reinforced substrate.

The invention also relates to a preform having excellent resin permeability at forming a composite from the carbon fiber reinforced substrate having such excellent handling properties.

Furthermore, the invention relates to a composite having excellent mechanical properties, which is formed from the preform having excellent resin permeability. The mechanical properties mean at least one property selected from the compression strength after impact and the compression strength after hot-wet conditioning.

BACKGROUND ART

Composites reinforced with carbon fibers have been used in applications of aircraft, space and sports, because of their excellent mechanical properties and lightweight.

As a typical method of producing such a composite, autoclave molding is known. In the method, a prepreg comprising a sheet composed of carbon fiber bundles each of which is formed with continuous carbon fibers arranged in one direction and a matrix resin being impregnated therewith. The prepregs are piled up in a mold and heated and pressurized in an autoclave, to be made into a composite.

The prepreg used as a substrate to be molded into a composite has an advantage in production of composite having high reliability. However, it also has a disadvantage that it is too stiff to be drapable. Furthermore, the production of a composite using the prepreg has such problems as high cost and low productivity.

For molding a composite at high productivity, injection molding or infusion molding is known. The injection or infusion molding includes, for example, resin transfer molding (RTM). In the resin transfer molding (RTM), a substrate composed of carbon fiber bundles not pre-impregnated with a matrix resin (dry carbon fiber bundles) is placed in a complicatedly shaped mold, and a matrix resin liquid (low viscosity) is injected or infused into the mold, for making the carbon fiber bundles impregnated with the matrix resin.

However, though the injection or infusion molding is excellent in composite productivity, the substrate used (for example, a dry woven fabric) has problems in view of handling properties such that texture slippage is liable to occur (un-stability of form), that the substrate is so less stiff as to allow easy bending, and that layers of the substrate do not adhere to each other when laminated (no tacky property). In addition, since the matrix resin must be low in viscosity, the composite has a problem of being low in mechanical properties, compared with the composite formed with a matrix resin having a high viscosity as used in the above-mentioned prepreg. These problems present a problem that the composite obtained cannot sufficiently exhibit the properties peculiar to carbon fibers and does not have the mechanical properties expected from the properties of the carbon fibers used.

To solve this problem, U.S. Pat. No. 5,071,711 A proposes a technique, in which a thermoplastic-like resin is applied to a fabric composed of reinforcing fibers, for improving the handling properties of the dry woven fabric used as a substrate, and stabilizing the form of the preform used for injection or infusion molding.

Furthermore, Journal of Advanced Materials, Volume 32, No. 3, Jul. 2000, P27–34 or Composites Part A, Volume 32, 2001, P721–729 reports that if a woven fabric is coated with a resin obtained by mixing an epoxy resin and elastomer particles or polyamide 6, for injection or infusion molding, the mechanical properties (such as the interlaminar fracture toughness of Mode II) of the obtained CFRP are improved.

However, the proposal cannot improve, or can improve only insufficiently, mechanical properties, though it can improve the handling properties of the substrate. That is, for example, the very high levels of mechanical properties required for primary or principal structure elements of aircraft cannot be achieved even if a woven fabric or the like is merely coated with a resin, and in the case where the carbon fibers used themselves do not have the necessary properties, the composite obtained using them cannot exhibit necessary mechanical properties (especially the compression strength after impact) either.

Moreover, in the injection or infusion molding methods described in the above-mentioned proposals, since a sheet composed of carbon fiber bundles merely arranged in one direction cannot be handled with the fiber orientation kept as it is in a dry state, a bi-directional woven fabric is used.

However, for example, primary or principal structure elements of aircraft require very high mechanical properties, especially the compression strength after impact and the compression strength after hot-wet conditioning. In a bi-directional woven fabric, carbon fiber bundles form a bi-directional weave structure. Therefore, the amount of reinforcing fibers in each direction is substantially one half. Furthermore, since the warp and the weft are almost equal in fineness or titer, large crimps of carbon fiber bundles are formed at the interlacing points of warp and weft. Because of these problems, the mechanical properties of a prepreg composed of carbon fibers arranged in two directions could be only halves of those of a prepreg composed of carbon fibers arranged in one direction.

That is, even though the required properties of the carbon fibers to be used and the form of the fabric composed of the carbon fibers are especially important factors for exhibiting high mechanical properties, the above-mentioned proposals do not disclose any explanation about such factors at all.

The object of the invention is to solve the problems of the prior art. Particularly, the object of the invention is to provide a carbon fiber reinforced substrate having excellent handling properties in such as stiffness, form stability, drapability and tackiness, to provide a preform formed with the substrate and having good matrix resin permeability, and to provide a composite formed with the preform having excellent mechanical properties in such as the compression strength after impact or the compression strength after hot-wet conditioning, and having also good productivity.

DISCLOSURE OF THE INVENTION

The carbon fiber reinforced substrate of the invention comprises a fabric composed of carbon fiber bundles and a first resin adhering to the fabric, and is characterized in that the carbon fiber bundles each of which comprises numerous continuous carbon filaments, that the tensile modulus of the carbon fiber bundles is 210 GPa or more, that the fracture strain energy of the carbon fiber bundles is 40 MJ/m$^3$ or more, and that the amount of the first resin adhering to the fabric is in a range from 1 to 20 parts by weight per 100 parts by weight of the fabric.

It is preferable that the amount of the first resin is in a range from 1 to 10 parts by weight per 100 parts by weight of the fabric.

It is preferable that the first resin adhering to the fabric adheres relatively more densely on a surface of the fabric than in the inside of the carbon fiber bundles.

It is preferable that the tensile modulus of the carbon fiber bundles is more than 280 and less than 500 GPa, and that the fracture strain energy of the carbon fiber bundles is 53 MJ/m$^3$ or more.

It is preferable that the fabric is a uni-directional woven fabric, bi-directional woven fabric or uni-directional sheet, that the carbon fiber unit weight of the carbon fiber reinforced substrate is in a range from 50 to 500 g/m$^2$, and that the thickness of the carbon fiber reinforced substrate is in a range from 0.1 to 0.8 mm.

It is preferable that the fabric is a uni-directional woven fabric or uni-directional sheet, and that the air permeability of the carbon fiber substrate is in a range from 10 to 200 cm$^3$/cm$^2$·sec.

It is preferable that the first resin is studded on a surface of the fabric, and that the diameters of the studded pieces are 1 mm or less.

It is preferable that the first resin discontinuously adheres on a surface of the fabric.

It is preferable that the first resin adheres on a surface of the fabric, and that the average thickness of the first resin adhering on the surface is in a range from 5 to 250 μm.

It is preferable that the melting point or flow initiation temperature of the first resin is in a range from 50 to 150° C.

It is preferable that the main component of the first resin is a thermosetting resin.

It is preferable that the main component of the first resin is a thermoplastic resin.

It is preferable that the amount of the thermoplastic resin is in a range from 70 to 100 wt % based on the weight of the first resin.

It is preferable that the main component of the first resin is at least one selected from the group consisting of epoxy resins, polyamide resins, polyetherimide resins, polyphenylene ether resins, polyether sulfone resins and phenoxy resins.

It is preferable that the amount of a second resin higher in melting point or flow initiation temperature than the first resin and adhering to the fabric is in a range from 1 to 10 parts by weight per 100 parts by weight of the fabric.

It is preferable that the amount of a second resin neither molten nor caused to flow at the melting point or flow initiation temperature of the first resin and adhering to the fabric is in a range from 1 to 10 parts by weight per 100 parts by weight of the fabric.

It is preferable that the second resin adheres on a surface of the fabric by means of the first resin.

It is preferable that the second resin is particles having an average particle diameter of 1 to 500 μm.

It is preferable that the main component of the second resin is a thermoplastic resin.

It is preferable that the main component of the second resin is at least one thermoplastic resin having a glass transition temperature of 30 to 280° C. selected from the group consisting of polyamide resins, polyamideimide resins, polyetherimide resins and polyether sulfone resins.

The preform of the invention is a laminate comprising at least two or more layers of the carbon fiber reinforced substrate, wherein the layers of the carbon fiber reinforced substrate are integrally bonded to each other by means of the first resin or the second resin.

The composite of the invention comprises at least the preform and a third resin, wherein the preform is impregnated with the third resin different from the first resin.

MEANINGS OF SYMBOLS IN THE DRAWINGS

Figure 1:
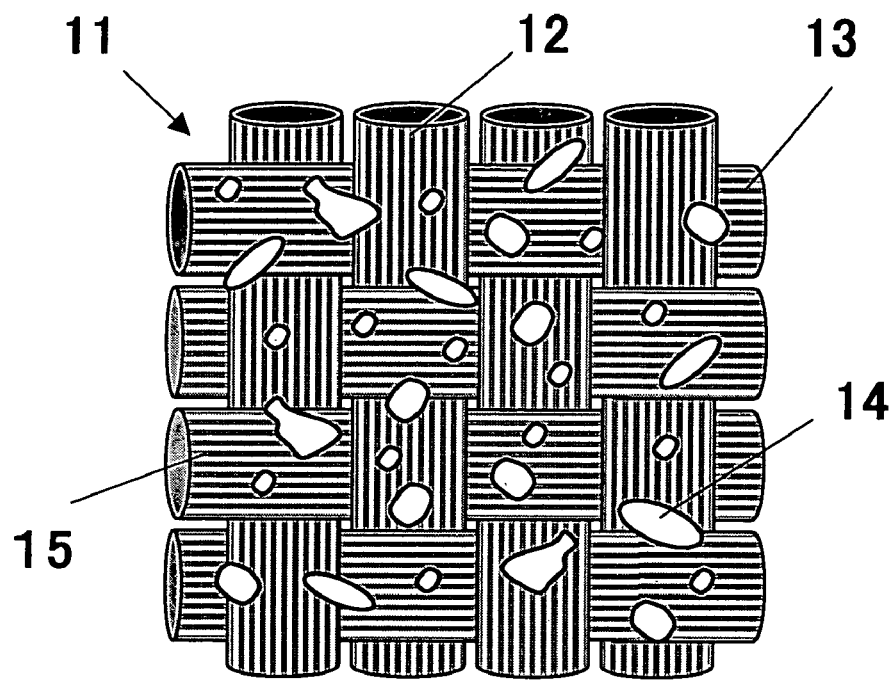
FIG. 1 is a typical plan view showing a mode of the carbon fiber reinforced substrate of the invention.

11, 21, 31, 41, 71, 81: a carbon fiber structure
12, 22, 32, 42, 52, 62, 72, 82: a warp yarn formed by carbon fibers
13, 33, 73: a weft yarn formed by carbon fibers
14, 24, 34, 44, 74, 84, 93, 103: a first resin
15, 25, 35, 45, 76, 86: a fabric
23, 43, 53, 63, 83: an auxiliary weft yarn formed by auxiliary fibers
51, 61: a unidirectional woven fabric
64: an auxiliary warp yarn formed by auxiliary fibers 75, 85, 94, 104: a second resin
90: a carbon fiber substrate
91: a preform
92: a fabric composed of continuous carbon fibers
101: a composite
102: a third resin
111: an aircraft
112: a main wing
113: a keel beam
114: a fuselage
115: a vertical fin
116: a horizontal stabilizer
121, 131: a structure element
122, 132: a skin
123, 133: a spar
124, 134: a stiffener

THE MOST PREFERRED MODES FOR CARRYING OUT THE INVENTION

The carbon fiber reinforced substrate of the invention comprises a fabric composed of carbon fiber bundles and a first resin adhering to the fabric. The carbon fiber bundles respectively comprises numerous continuous carbon filaments. The carbon fiber bundles have a tensile modulus of 210 GPa or more and a fracture strain energy of 40 MJ/m$^3$ or more. The amount of the first resin adhering to the fabric is in a range from 1 to 20 parts by weight per 100 parts weight of the fabric.

The continuous carbon filaments mean that carbon filaments are substantially continuous in the fabric. The expression of being substantially continuous is used in consideration that there is a case where a very small number of carbon filaments is broken during forming of a carbon fiber bundle or forming of a fabric.

The carbon fiber bundle in the carbon fiber substrate of the invention has a tensile modulus of 210 GPa or more and a fracture strain energy of 40 MJ/m$^3$ or more.

It is preferable that the tensile modulus is more than 250 and less than 600 GPa, more preferably more than 280 and less than 500 GPa, and still more preferably more than 290 and less than 400 GPa.

If the tensile modulus is less than 210 GPa, the mechanical properties of the composite formed using the carbon fiber substrate are not sufficient.

The tensile modulus is measured according to the measuring method specified in JIS-R-7601. The unit is GPa.

It is preferable that the fracture strain energy is 45 MJ/m$^3$ or more, more preferably 53 MJ/m$^3$ or more, and still more preferably 56 MJ/m$^3$ or more. A higher fracture strain energy is desireable, however, based on usually available carbon fiber bundles at present, generally the fracture strain energy is 80 MJ/m$^3$ or less.

If the fracture strain energy is less than 40 MJ/m$^3$, the mechanical properties of the composite formed by the carbon fiber substrate are not sufficient. That is, when the composite is impacted, there is a case where fracture occurs to the carbon fiber bundles. The mechanical properties can be judged in reference to the compression strength at room temperature after impact (hereinafter abbreviated as CAI).

Especially if the fracture strain energy is less than 40 MJ/m$^3$, the composite having a quasi-isotropic stack architecture formed by laminating plural uni-directional fabrics respectively having carbon fiber bundles arranged in one direction becomes very low in CAI.

The CAI of a composite is a mechanical property highly respected when the composite is used as a structure element (especially as a primary or principal structure element) of a transport machine (especially an aircraft). For using a composite as such a structure element, recently it is highly demanded that the composite has an excellent CAI.

The fracture strain energy (W) is calculated from equation $W=\sigma^2/2\times E$ based on the tensile strength ($\sigma$) and tensile modulus (E) measured according to the measuring methods specified in JIS-R-7601. The unit is MJ/m$^3$ ($10^6 \times$J/m$^3$).

The amount of the first resin adhering to the fabric in the carbon fiber substrate of the invention is in a range from 1 to 20 parts by weight per 100 parts by weight of the fabric. It is preferable that the amount is in a range from 1 to 10 parts by weight.

The first resin may exist inside the fabric, that is, between the respectively adjacent carbon fiber bundles or between the respectively adjacent carbon filaments in each carbon fiber bundle, or may be maldistributed and adhere relatively more densely on a surface of the fabric rather than in the inside of the fabric.

Maldistribution means a state that the first resin of 70 vol % or more, desirably 80 vol % or more, more desirably 90 vol % or more exists on a surface of the fabric.

Adhesion of the first resin to the fabric in amount of from 1 to 20 parts by weight per 100 parts by weight of the fabric brings tacky (adhesive) property between substrates at forming a perform by laminating the carbon fiber reinforced substrates each other. Furthermore, a moderate stiffness is imparted to the fabric, and a form stability of the fabric is brought by preventing texture slippage of the carbon fiber bundles in the fabric. As a result, a carbon fiber reinforced substrate having excellent handling properties can be obtained.

The first resin in the adhesive amount functions as a crack stopper in the composite obtained by laminating layers of the carbon fiber reinforced substrate and also functions to relax the thermal residual stress when the composite is molded. Especially when the composite is impacted, the first resin functions to prevent the interlaminar damage of the carbon fiber reinforced substrate, and gives excellent mechanical properties (especially CAI, tensile strength and compression strength), i.e., a toughening effect to the composite.

The carbon fiber reinforced substrate of the invention has been completed based on a finding that the toughening effect by the first resin can be obtained when the first resin is used in combination with carbon fiber bundles having a fracture strain energy of 40 MJ/m$^3$ or more.

In the case where carbon fiber bundles having a fracture strain energy of 40 MJ/m$^3$ or more are not used, the toughening effect by the first resin declines to such a non-detectably low level. On the contrary, in the case where the deposited amount of the first resin adhering to the fabric is not in the above-mentioned range even if the carbon fiber bundles are used, the toughening effect by the first resin cannot be essentially exhibited.

In addition to the toughening effect, if the first resin adheres relatively more densely on a surface of the fabric, the first resin adhering on the surface of the fabric functions as a spacer in the case where layers of the carbon fiber reinforced substrate are laminated on each other, to form a space between the adjacent layers of the carbon fiber reinforced substrate. This is called the spacer effect by the first resin.

The spacer effect plays the role of forming flow paths for a third resin which is a matrix resin hereinafter explained, at molding of a composite by injecting or infusing the third resin into the laminated carbon fiber substrates. The spacer effect facilitates the permeation of the third resin into the substrate, raises permeating speed, and enhances the composite productivity.

The spacer effect plays also the role to work on the toughening effect of the first resin intensively in the interlaminar portion between the substrate layers of the composite. As a result, a further higher toughening effect can be achieved. This is called the interlaminar toughening effect by the first resin. This effect was not expected in the beginning.

The toughening effect, the spacer effect and the interlaminar toughening effect by the first resin are promoted still more by maldistributing the first resin on a surface of the fabric.

The first resin may adhere relatively more densely on one surface of a single-layer fabric or on both surfaces of the fabric. The former is preferable for producing a carbon fiber reinforced substrate having the first resin adhering relatively more densely to the fabric in a lower cost. If it is not desired to discriminate the front and reverse surfaces of the carbon fiber substrate, the latter is desirable. In a multilayer fabric, the first resin may adhere to one surface each or both surfaces each of the outermost layers, but it is preferable that the first resin adheres to the surfaces of the respective layers, since higher effects can be achieved.

In JP 6-94515 B or JP 5-337936 A, a technique on disposing a fine powder or a woven fabric on a surface of a prepreg used for autoclave molding is disclosed. However, for the present invention intended for providing a composite at a high productivity, autoclave molding is not suitable. The handling properties such as stiffness and drapability cannot be achieved in the conventional prepreg. Since the conventional prepreg is impregnated with a tacky matrix resin (corresponding to the third resin described later), it is easy to dispose a powder and the like on it for adhesion. However, quite a novel technical concept is necessary for disposing a powder or the like on a dry and non-tacky fabric.

The present invention is described below more particularly in reference to drawings.

FIG. 1 is a typical plan view showing a mode of the carbon fiber reinforced substrate of the invention. In FIG. 1, a carbon fiber reinforced substrate 11 comprises a fabric 15 and a first resin 14 adhering to the fabric 15. The fabric 15 comprises warp yarns 12 formed by carbon fiber bundles and weft yarns 13 formed by carbon fiber bundles, and the warp yarns 12 and the weft yarns 13 form the fabric 15 in a plain weave. The fabric 15 is a kind of bi-directional woven fabric. Each of the carbon fiber bundles used as the warp yarns 12 and the weft yarns 13 respectively comprises numerous continuous carbon filaments. The first resin 14 is studded on a surface of the fabric 15.

Figure 2:
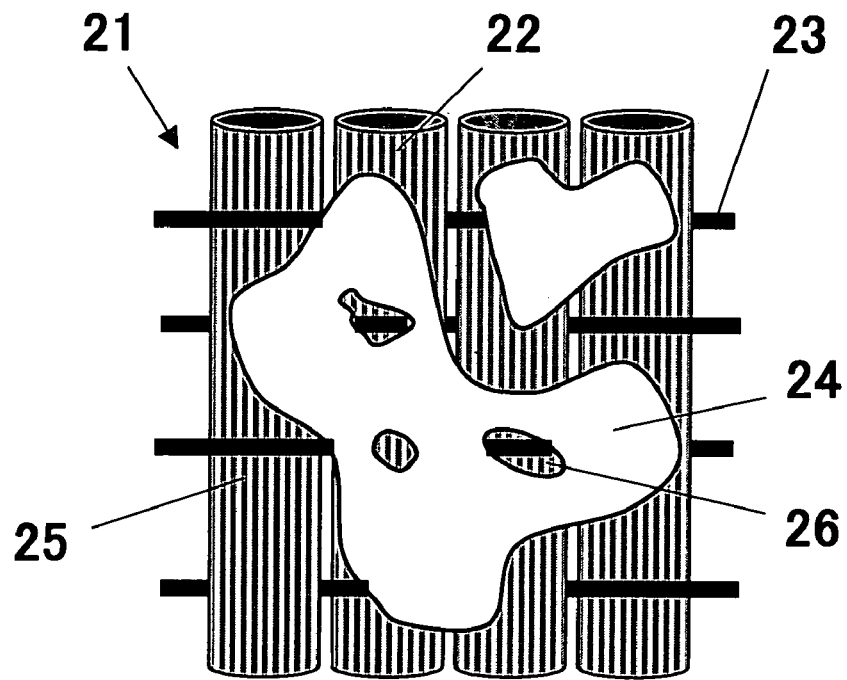
FIG. 2 is a typical plan view showing another mode of the carbon fiber reinforced substrate of the invention.

FIG. 2 is a typical plan view showing another mode of the carbon fiber reinforced substrate of the invention different from the mode of FIG. 1. In FIG. 2, a carbon fiber reinforced substrate 21 comprises a fabric 25 and a first resin 24 adhering to the fabric 25. The fabric 25 comprises warp yarns 22 formed by carbon fiber bundles and auxiliary weft yarns 23 formed by auxiliary yarns thinner than the warp yarns 22, and the warp yarns 22 and the auxiliary weft yarns 23 form the fabric 25 in a plain weave. Since the fabric 25 is mainly composed of warp yarns 22 formed by carbon fiber bundles, it is a kind of uni-directional woven fabric. Each of the carbon fiber bundles used as the warp yarns 22 comprises numerous continuous carbon filaments. The first resin 24 adheres to a surface of the fabric 25 discontinuously.

Figure 3:
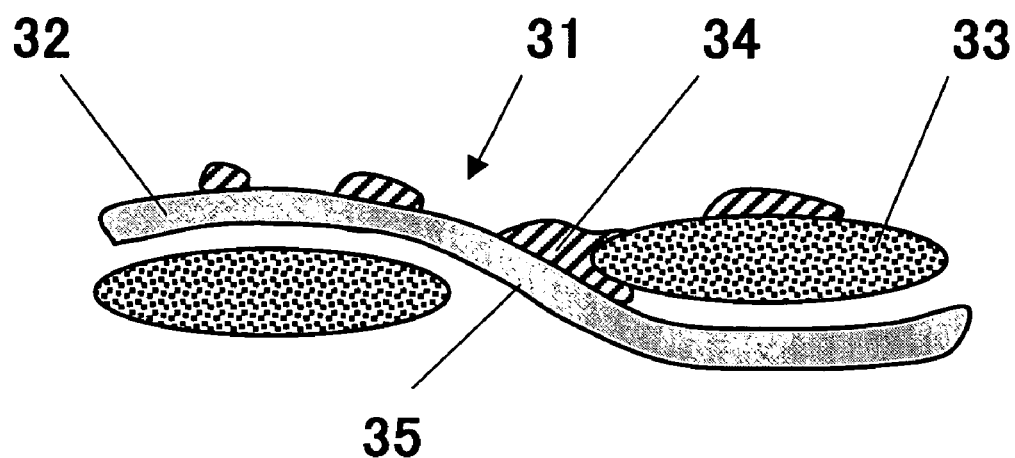
FIG. 3 is a typical vertical sectional view showing yet another mode of the carbon fiber reinforced substrate of the invention.

FIG. 3 is a typical vertical sectional view showing yet another mode of the carbon fiber reinforced substrate of the invention. In FIG. 3, a carbon fiber reinforced substrate 31 comprises a fabric 35 and a first resin 34 adhering to the fabric 35. The fabric 35 comprises warp yarns 32 formed by carbon fiber bundles and weft yarns 33 formed by carbon fiber bundles, and the warp yarns 32 and the weft yarns 33-form the fabric 35 in a plain weave. This fabric 35 is a kind of bi-directional woven fabric. Each of the carbon fiber bundles used as the warp yarns 32 and the weft yarns 33 respectively comprises numerous continuous carbon filaments. The first resin 34 adheres relatively more densely on a surface of the fabric 35.

Figure 4:
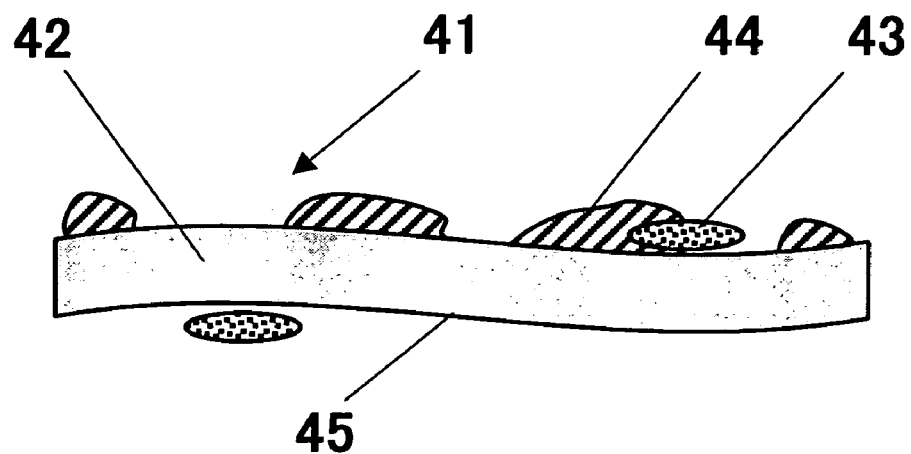
FIG. 4 is a typical vertical sectional view showing a still further mode of the carbon fiber reinforced substrate of the invention.

FIG. 4 is a typical vertical sectional view showing still further mode of the carbon fiber reinforced substrate of the invention different from the mode of FIG. 3. In FIG. 4, a carbon fiber reinforced substrate 41 comprises a fabric 45 and a first resin 44 adhering to the fabric 45. The fabric 45 comprises warp yarns 42 formed by carbon fiber bundles and weft yarns 43 formed by auxiliary fiber bundles. The warp yarns 42 and the weft yarns 43 form the fabric 45 in a plain weave. Since the fabric 45 is mainly composed of the warp yarns 42 formed by carbon fiber bundles, it is a kind of unidirectional woven fabric. Each of the carbon fiber bundles used as the warp yarns 42 comprises numerous continuous carbon filaments. The first resin 44 relatively more densely adheres to a surface of the fabric 45.

The first resin may adhere as dots on a surface of the fabric 15 as shown as the first resin 14 in FIG. 1, or may adhere on a surface of the fabric 25 to more widely cover the surface than in FIG. 1 but discontinuously, as shown as the first resin 24 in FIG. 2.

The state in which the first resin 14 adheres as dots on a surface of the fabric 15 in FIG. 1 is also explained as follows. That is, in FIG. 1, if a surface of the fabric 15 is considered as the sea while the first resin 14 is considered as islands, then the first resin 14 existing on the surface of the fabric 15 shown in FIG. 1 can be said to be a group of numerous small islands. The maximum width of the small islands is smaller than the widths of the warp yarns 12 and the weft yarns 13.

The state in which the first resin 24 adheres on a surface of the fabric 25 discontinuously in FIG. 2 is also explained as follows. That is, in FIG. 2, if a surface of the fabric 25 is considered as the sea while the first resin 24 is considered as islands in FIG. 2, then the first resin 24 existing on the surface of the fabric 25 shown in FIG. 2 can be said to be a group of many large islands scattered in the sea. Some of the large islands contain lakes 26 in them. The minimum width of the large islands is larger than the width of each warp yarn 22, and smaller than the total width of four warp yarns 22.

Though not illustrated, a figure of existing of the first resin may also be a mixed state of the small islands shown in FIG. 1 and the large islands shown in FIG. 2.

It is not preferred that the first resin adheres to the fabric in such a manner as to cover the fabric entirely like a film, since the permeation (especially the permeation in the direction perpendicular to the laminate surface) of the third resin described later into the carbon fiber reinforced substrates laminated is remarkably inhibited. Furthermore, it is not preferred either that the first resin can easily absorb water and adheres to the fabric in such a manner as to cover the fabric continuously not only as a film but also as filaments or a non-woven fabric, since where a formed composite is treated in hot-wet condition, the water absorption effect extends in a wide range through the first resin.

Therefore, it is desirable that the first resin adheres like dots or discontinuously. In the case where the first resin adheres on a surface of the fabric 15 like dots as shown in FIG. 1, if the average diameter of the dots (islands) (the average minor axis if the dots are oval) is smaller, the dots can be dispersed more uniformly on the surface of the fabric 15. So, it is desirable that the average diameter is 1 mm or less, more desirably 250 μm or less, and still more desirably 50 μm or less.

In the case where plural layers of the carbon fiber reinforced substrate having the first resin relatively more densely adhering to the surfaces of the fabric layers are laminated, if the first resin relatively more densely adhering on the surfaces of the fabric layers is excessively rugged in the direction perpendicular to the surfaces of the substrate, the carbon fiber bundles located in contact with the first resin are greatly deflected. In this case, the compression properties of the composite such as the compression strength at room temperature (hereinafter abbreviated as CS) and the compression strength at high temperature after hot-wet conditioning (hereinafter abbreviated as CHW) may be impaired. On the other hand, if the amount of the first resin is too small, the composite cannot have desired properties.

In view of the above, it is preferred that the average thickness of the first resin on the surface of the fabric is in a range from 5 to 250 μm. A more preferred range is from 10 to 100 μm, and a further more preferred range is from 15 to 60 μ.

The amount of the first resin deposited on the fabric is in a range from 1 to 20 parts by weight per 100 parts by weight of the fabric. A preferred deposited amount range is from 1 to 10 parts by weight, and a more preferred range is from 3 to 7 parts by weight. A further more preferred range is from 4 to 6 parts by weight.

If the deposited amount of the first resin is less than 1 part by weight, the handling properties of the carbon fiber reinforced substrate such as stiffness, form stability, drapability and tackiness in lamination become poor, and the effect of improving the mechanical properties of the composite is also small.

If the deposited amount of the first resin is more than 20 parts by weight, the composite obtained cannot be excellent in mechanical properties, especially in CHW, and carbon fiber content of the composite becomes too low. Furthermore, it can happen that the permeation of the third resin as the matrix resin described later into the carbon fiber reinforced substrate or into the preform may be prevented when the composite is produced. In the case where the deposited amount of the first resin is 10 parts by weight or less, since the preform in the composite can be made narrow in the interlayer space and smooth, compression properties such as CHW and CS can be more improved.

The fabric is composed of carbon fiber bundles. The fabric can be in any of various known forms such as a woven fabric (uni-directional, bi-directional or 3D woven fabric, etc.), knitted fabric, braid, fabric with warp yarns (carbon fiber bundles) arranged in parallel to each other in one direction (hereinafter called a uni-directional sheet), multi-axial sheet obtained by overlaying two or more uni-directional sheet in different directions, etc. The fabric can also be an integral product comprising plural fabrics bonded by any of various binding means such as stitch yarns, knot yarns or resin (porous film, nonwoven fabric, binder, etc.).

In the case where the composite is used as a structure element of a transport machine, it is preferred that the fabric of the carbon fiber reinforced substrate is a uni-directional woven fabric, bi-directional woven fabric, uni-directional sheet or multi-axial fabric (especially multi-axial fabric bonded by stitch yarns).

A primary or principal structure element of an aircraft is required to have very high mechanical properties (especially CAI and CHW). In a bi-directional woven fabric, since the carbon fiber bundles form a bi-directional weave structure, it can happen that the crimps of the carbon fiber bundles become large at the interlacing points between warp yarns and weft yarns. In this case, it can happen that the first resin 34 does not exist at interlacing points between the warp yarns 32 and the weft yarns 33, though it exists in FIG. 3. In this case, the mechanical properties may not be able to meet the requirement.

Therefore, to obtain more preferred mechanical properties, it is preferred that the fabric is a uni-directional woven fabric or a uni-directional sheet. Furthermore, considering the permeation of the matrix resin, especially preferred is a uni-directional woven fabric, in which small crimps formed by weft auxiliary yarns exist between warp yarns (carbon fiber bundles). The crimps are useful for forming the passages for allowing the permeation of the matrix resin, to remarkably enhance the matrix resin permeability of the preform.

Figure 5:
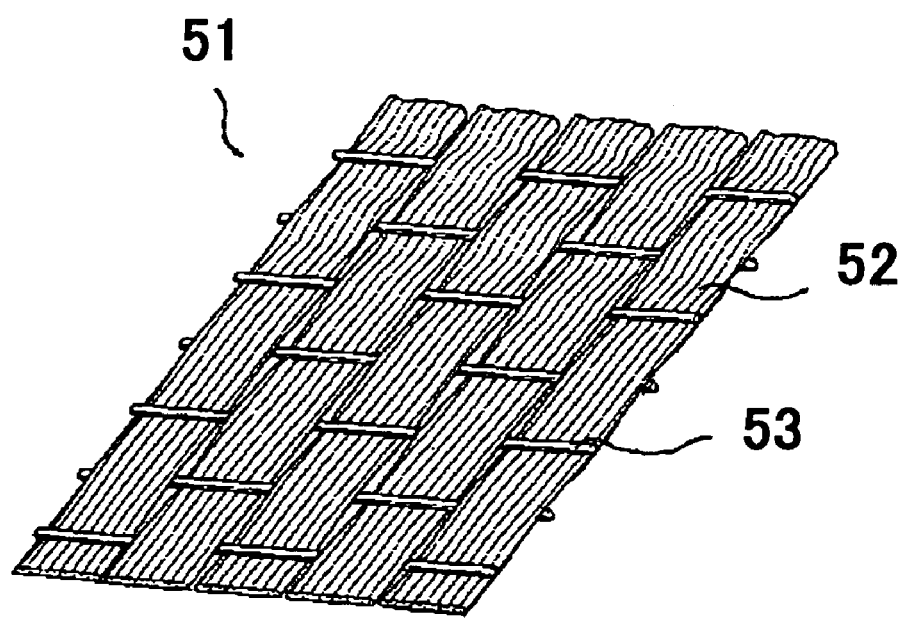
FIG. 5 is a perspective view showing another mode (uni-directional woven fabric) of the fabric used in the carbon fiber reinforced substrate of the invention.

FIG. 5 is a perspective view showing another mode (uni-directional woven fabric) of the fabric used in the carbon fiber reinforced substrate of the invention. In FIG. 5, a uni-directional woven fabric 51 is a plain weave, in which warp yarns 52 arranged in parallel to each other in one direction and auxiliary weft yarns 53 perpendicular to the warp yarns 52 interlace with each other. The warp yarns 52 are formed by carbon fiber bundles, and the auxiliary weft yarns 53 are formed by auxiliary fiber bundles.

Each of the carbon fiber bundles forming the warp yarns 52 of the uni-directional woven fabric 51 comprises 5,000 to 50,000 continuous carbon filaments. More preferred number of carbon filaments in each carbon fiber bundle is 10,000 to 25,000.

It is preferred that the fineness or titer of the warp yarns 52 of the unidirectional woven fabric 51 is in a range from 300 to 5,000 tex. If the fineness is less than 300 tex, the number of interlacing points between the warp yarns 52 and the auxiliary weft yarns 53 is too large. As a result, the crimps at the interlacing points become large, and the number of crimps also becomes large. In this case, it can happen that the mechanical properties of the obtained composite become poor. If the fineness is more than 5,000 tex, the number of interlacing points is too small, and the form stability of the carbon fiber reinforced substrate may become low.

It is preferred that the auxiliary fiber bundles forming the auxiliary weft yarns 53 are selected to ensure that the crimps of the warp yarns 52 at the interlacing points between the warp yarns 52 and the auxiliary weft yarns 53 become small. In this case, the properties of the carbon fiber bundles used as the warp yarns 52 can be exhibited to the maximum possible extent.

It is preferred that the fineness of the auxiliary fiber bundles forming the auxiliary weft yarns 53 is not more than ⅕ of the fineness of the carbon fiber bundles forming the warp yarns 52, more preferably 1/10 or less. The particular fineness depends on the kinds of the carbon fiber bundles and auxiliary fiber bundles used and the unit weight of the woven fabric. For example, in the case where carbon fiber bundles of 800 tex are used to form a woven fabric with a unit weight of 200 g/m$^2$, it is preferred that the fineness of the auxiliary fiber bundles is in a range from 10 to 100 tex, more preferably from 20 to 50 tex.

It is preferred that the number of weft ends of the auxiliary weft yarns 23 (FIG. 2) or the auxiliary weft yarns 53 (FIG.

5) is in a range from 0.3 to 6 ends/cm for stabilizing the form of the fabric and for minimizing the influence of warp yarn crimps, more preferably from 1 to 4 ends/cm.

For the auxiliary fiber bundles, any desired material can be used. However, in view of the stability of warp ends and weft ends, a material that is unlikely to be shrunken, for example, by the heating for molding is preferred. For example, carbon fibers, glass fibers, organic fibers such as aramid fibers, polyamide fibers (especially POY), PBO fibers, PVA fibers or PE fibers, or a combination thereof can be used. The fibers secondarily yarned, for example, doubled, twisted, wooly-treated or crimped can also be used.

Warp yarns, weft yarns and auxiliary weft yarns may also be used in combination with an adhesive component for fixing the weave structure. Examples of the adhesive component include thermoplastic resins such as nylon resins and polyester resins, thermosetting resins such as epoxy resins, unsaturated polyester resins and phenol resins, etc. The form of the adhesive component can be fibers, particles, emulsion or dispersion, etc. The adhesive component in any of these forms may be combined with warp yarns, weft yarns or auxiliary weft yarns. Above all, if the adhesive component in the form of fibers is twisted together with the auxiliary fiber bundles or used as covering yarns for covering the auxiliary fiber bundles, for use as auxiliary weft yarns, the effect of fixing the weave structure is high.

The uni-directional woven fabric may be a plain weave shown in FIG. 5, or a twill weave or a satin weave. Furthermore, a woven fabric with a non-crimp structure as shown in FIG. 6 may also be used.

Figure 6:
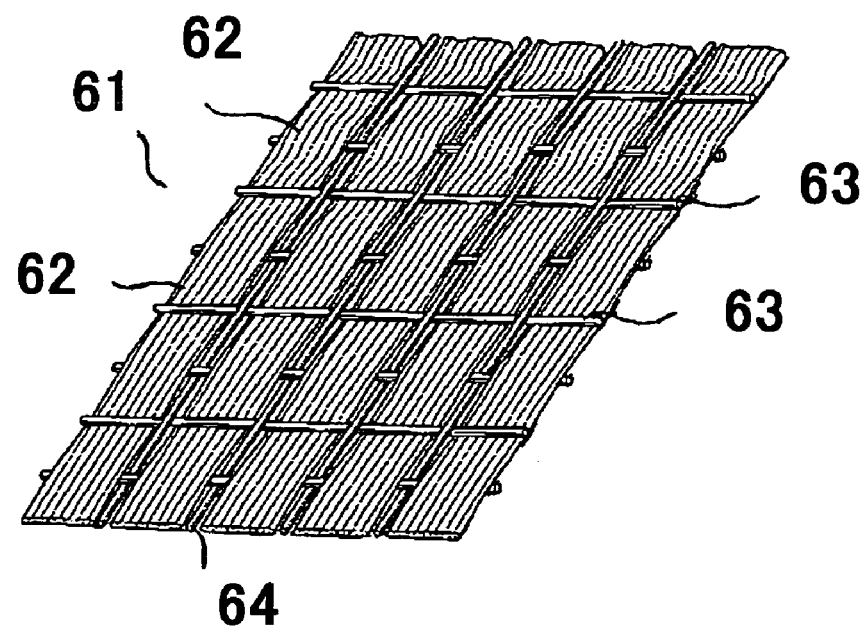
FIG. 6 is a perspective view showing yet another mode (uni-directional woven fabric) of the fabric used in the carbon fiber reinforced substrate of the invention.

FIG. 6 is a perspective view showing yet another mode (uni-directional woven fabric) of the fabric used in the carbon fiber reinforced substrate of the invention. In FIG. 6, a uni-directional woven fabric 61 comprises warp yarns 62 formed by carbon fiber bundles, auxiliary warp yarns 64 formed by auxiliary fiber bundles arranged in parallel with the warp yarns 62, and auxiliary weft yarns 63 formed by auxiliary fiber bundles arranged in the direction perpendicular to the yarns 62 and 64. The auxiliary warp yarns 64 and the auxiliary weft yarns 63 are interlaced with each other, to integrally hold the warp yarns 62 formed by carbon fiber bundles, for forming the woven fabric (woven fabric having a non-crimp structure) 61.

The woven fabric (woven fabric having a non-crimp structure) 61 has further smaller crimps than the uni-directional woven fabric 51 with a plain weave shown in FIG. 5. So, the composite produced by the woven fabric can more highly exhibit the properties of the carbon fiber bundles. Furthermore, also in view of matrix resin permeation, since the auxiliary fiber bundles provide resin permeation passages, the permeability is very excellent.

In the case where the fabric is a bi-directional woven fabric, uni-directional woven fabric or uni-directional sheet, in view of the permeation of the third resin described later into the carbon fiber reinforced substrate or into the preform and the mechanical properties of the composite, it is preferred that the carbon fiber unit weight of the carbon fiber reinforced substrate, i.e., the carbon fiber unit weight of the fabric is in a range from 50 to 500 g/m$^2$, more preferably from 100 to 350 g/m$^2$, and still more preferably from 150 to 250 g/m$^2$. It is preferred that the thickness of the carbon fiber reinforced substrate is in a range from 0.1 to 0.8 mm, more preferably from 0.15 to 0.7 mm, and still more preferably from 0.2 to 0.6 mm.

In the case where the fabric is a multi-axial fabric, it is preferred that the carbon fiber unit weight of the carbon fiber reinforced substrate is in a range from 150 to 1500 g/m$^2$, more preferably from 300 to 1000 g/m$^2$, and still more preferably from 400 to 800 g/m$^2$. The reasons why the carbon fiber unit weight of a multi-axial fabric can be larger than that of a uni-directional woven fabric or the like are that especially in the case where stitch yarns or the like exist in the thickness direction, the resin paths in the thickness direction can be secured, to allow easier resin permeation, and that if the unit weight is small, it is not necessary to have a multi-layer fabric.

In view of resin permeability, it is preferred that the air permeability of the carbon fiber reinforced substrate is in a range from 10 to 200 cm$^3$/cm$^2$·sec, more preferably from 12 to 120 cm$^3$/cm$^2$·sec, and still more preferably from 15 to 100 cm$^3$/cm$^2$·sec.

If the air permeability is less than 10 cm$^3$/cm$^2$·sec, the resin permeability is too low. An air permeability of more than 200 cm$^3$/cm$^2$·sec is not preferred, since the voids in the fabric become too large though the resin permeability is excellent, and since the composite obtained has many resin-rich portions formed, the lowering of mechanical properties, thermal cracking and the like occur.

The air permeability is expressed as the amount of air permeating the fabric measured according to the method A described in JIS-L-1096 (Frazier type). The value of air permeability in the specification is measured by AP-360 produced by K. K. Daiei Kagakuseiki Seisakusho.

In order to minimize the coming-off of the first resin from the fabric when the fabric is coated with the first resin and also in order to exhibit the properties of the carbon fiber bundles per se to the maximum extent, it is preferred that the cover factor of the fabric is 90% or more. It is more preferable the cover factor of the fabric is 97% or more, and still more preferable 99% or more.

The cover factor refers to the percentage of the closed (covered) portions where the carbon fibers (auxiliary yarns, stitch yarns, knot yarns and the like as the case may be) exist in the fabric per unit area of 100 mm×100 mm when the planar fabric is observed in the direction perpendicular to it. The cover factor (%) is calculated from the following equation: Cover factor (%)=Total area (mm$^2$) of closed portions/10,000. In the case where the carbon fiber reinforced substrate is used for measuring the cover factor, the portions closed by the first resin are not included. That is, the cover factor of the fabric can be considered to be the same as the cover factor of the carbon fiber reinforced substrate.

This measurement is carried out at least five times at optional places of the fabric. The value of cover factor is the average value of these measured values. The total area of the closed portions is calculated by means of image processing based on the image optically picked up by a CCD camera or scanner, etc.

A fabric having a cover factor of 90% or more is, for example, a fabric formed by carbon fiber bundles respectively having a width of 4 mm or more and flat in cross sectional form (a fabric comprising flat carbon fiber bundles). It is preferred that the width of each carbon fiber bundle is 5 mm or more, more preferably 6 mm or more.

It is preferred that the flat carbon fiber fabric is spread by means of compressed air, roller or indenter, etc. The reason is that the spreading can reduce the thickness of the fabric and enhance the carbon fiber content in the composite. The flat carbon fiber fabric (woven fabric) per se is disclosed in more detail in JP 2955145 and JP 11-1840 A. It is preferred that the carbon fiber bundles are substantially not twisted in view of matrix resin permeability and the exhibition of mechanical properties.

It is preferred that the first resin has a melting point or flow initiation temperature of 50 to 150° C. in view of the temperature used for obtaining the tackiness necessary for laminating layers of the carbon fiber reinforced substrate. It is more preferred that the melting point or flow initiation temperature is in a range from 70 to 140° C., still more preferably from 90 to 120° C.

For a resin showing a melting point, the melting point refers to the temperature measured using a differential scanning calorimeter (DSC), at which the resin is molten. For a resin not showing a melting point, the flow initiation temperature refers to the temperature measured by means of viscoelasticity measurement (Flow Tester CFT 500D produced by Shimadzu Corp, heating rate 1.5° C./min), at which the resin begins flowing.

It is preferred that the water absorption coefficient (equilibrium water absorption coefficient) of the first resin at 23° C. and 50% RH is 3 wt % or less. It is more preferable that the water absorption is 2.2 wt % or less, still more preferably 1.8 wt % or less, further more preferably 1.4 wt % or less.

If the equilibrium water absorption coefficient is more than 3 wt %, a composite with excellent mechanical properties (especially CHW) may not be obtained. The equilibrium water absorption coefficient is measured according to the method described in ASTM-D-570.

The first resin is not especially limited, if it can improve the handling properties of the carbon fiber reinforced substrate and improve the mechanical properties of the composite obtained by using the carbon fiber reinforced substrate. As the first resin, a thermosetting resin and/or a thermoplastic resin may be adequately selectively used.

Examples of the thermosetting resin include epoxy resins, phenol resins, polybenzoimidazole resins, benzoxazine resins, cyanate ester resins, unsaturated polyester resins, vinyl ester resins, urea resins, melamine resins, bismaleimide resins, polyimide resins and polyamideimide resins, their copolymers and modification products, resins obtained by blending two or more of the foregoing, and resins containing an elastomer, rubber component, curing agent, curing accelerator, catalyst or the like.

Examples of the thermoplastic resin include polyester resins, polyolefin resins, styrene-based resins, polyoxymethylene resin, polyamide resins, polyurethane resins, polyurea resins, polydicyclopentadidene resin, polycarbonate resins, polymethylene methacrylate resin, polyetherimide resins, polysulfone resins, polyallylate resins, polyether sulfone resins, polyketone resins, polyether ketone resins, polyether ether ketone resins, polyether ketone ketone resins, polyarylate resins, polyether nitrile resins, polyimide resins, polyamideimide resins, phenol resins, phenoxy resins, fluorine-based resins such as polytetrafluoroethylene resin, elastomers (preferably butadiene acrylonitrile, its carboxylic acid or amine modification products, fluoroelastomers, polysiloxane elastomers), rubbers (butadiene, styrene butadiene, styrene butadiene styrene, styrene isoprene styrene, natural rubber, etc.), resins for RIM (e.g., those containing a catalyst or the like capable of forming polyamide 6, polyamide 12, polyurethane, polyurea or polycicyclopentadiene), cyclic oligomers (those containing a catalyst or the like capable of forming a polycarbonate resin, polybutylene terephthalate resin, etc.), the copolymers and modification products thereof, resins obtained by blending two or more of the foregoing, etc.

In the case where a thermosetting resin is used as the main component of the first resin, at least one selected from the group consisting of epoxy resins, unsaturated polyester resins and phenol resins is preferred. Above all, an epoxy resin is especially preferred. If an epoxy resin is used, the handling properties of the substrate are excellent since the adhesiveness is high, and especially in the case where an epoxy resin is used as the third resin described later, high mechanical properties can be preferably exhibited.

In the case where an epoxy resin is used as the main component of the first resin, it may, or is not required to, contain a curing agent, curing catalyst or the like. In view of the life of the first resin, the latter is preferred. Even in the former case, a highly latent curing agent or curing catalyst does not pose any large problem.

In the case where a thermoplastic resin is used as the main component of the first resin, at least one selected from the group consisting of polyamide resins, polysulfone resins, polyether sulfone resins, polyetherimide resins, polyphenylene ether resins, polyimide resins, polyamideimide resins and phenoxy resins is preferred. Among them, polyamide resins, polyetherimide resins, polyphenylene ether resins, polyether sulfone resins and phenoxy resins are especially preferred.

It is preferred that a thermoplastic resin is the main component of the first resin, and that its content is in a range from 70 to 100 wt %. A more preferred range is 75 to 97 wt %, and a further more preferred range is 80 to 95 wt %. If the content is less than 70 wt %, it may be difficult to obtain a composite with excellent mechanical properties. In. the case where a thermoplastic resin is used as the main component, it may happen that the adhesiveness of the first resin to the fabric or the possibility of making the first resin adhesive to the fabric becomes low. In this case, it is desirable to add a small amount of a tackifier, plasticizer or the like to the first resin.

In the carbon fiber reinforced substrate, it is preferred that a second resin higher than the first resin in melting point or flow initiation temperature adheres to the fabric, in addition to the first resin. It is preferred that the amount of the second resin adhering to the fabric is in a range from 1 to 10 parts by weight per 100 parts by weight of the fabric. In this case, the mechanical properties (especially CAI and CHW) can be further highly exhibited. It is preferred that the second resin has a melting point or flow initiation temperature of 150° C. or higher. It is more preferred that the melting point or flow initiation temperature is 180° C. or higher, and further more preferred is 210° C. or higher.

It is only required that the second resin is not molten or does not flow at the melting point or flow initiation temperature of the first resin. A resin having neither a melting point nor a flow initiation temperature, that is, a resin capable of being decomposed before being molten or before beginning to flow can also be used as the second resin.

If the second resin adheres to the fabric in addition to the first resin, preferably if these resins relatively more densely adhere on a surface of the fabric, the toughening effect and the interlaminar toughening effect can be more highly exhibited compared with the case where the first resin only adheres to the fabric, and as a result, the mechanical properties (especially CAI) of the composite obtained by laminating layers of the carbon fiber reinforced substrate can be remarkably improved.

The reason why the second resin can more highly exhibit the effects than the first resin is that the second resin has a melting point or flow initiation temperature higher than that of the first resin, or that the second resin is not molten or does not flow at the temperature at which the first resin is molten or begins to flow. In addition, since the adhesive first resin already exists, the second resin per se is not absolutely required to be adhesive, and a highly tough but non-adhesive resin or a resin incapable of contributing to improving the handling properties of the substrate can also be used. So, the second resin can be selected from a considerably wide range of resins in terms of material and form than the first resin.

Considering the above-mentioned mechanisms, if a resin that becomes adhesive at a relatively low temperature and does not lower the mechanical properties (preferably improves the mechanical properties) is used as the first resin while a resin capable of more highly exhibiting the mechanical properties is used as the second resin adhering to the dry fabric, a more preferred carbon fiber substrate can be obtained.

The second resin may adhere in the inside of the fabric or adheres relatively more densely on a surface of the fabric, but for efficiently exhibiting the effects, it is preferred that the second resin relatively more densely adheres substantially on a surface of the fabric like the first resin.

It is preferred that the amount of the second resin deposited on the fabric is in a range from 1 to 10 parts by weight per 100 parts by weight of the fabric. It is more preferred that the deposited amount is in a range from 2 to 9 parts by weight per 100 parts by weight of the fabric. A further more preferred range is 3 to 7 parts by weight, and an especially preferred range is 4 to 6 parts by weight.

If the deposited amount of the second resin is less than 1 part by weight, the effect of improving mechanical properties may be small. If the deposited amount of the second resin is more than 10 parts by weight, it can happen that the composite obtained is not especially excellent in CHW after hot-wet conditioning, and the carbon fiber content of the composite is too small. In addition, when the composite is obtained, the permeation of the third resin described later as the matrix resin into the carbon fiber reinforced substrate may be prevented.

Meaning of using of the second resin is explained more particularly in reference to drawings.

Figure 7:
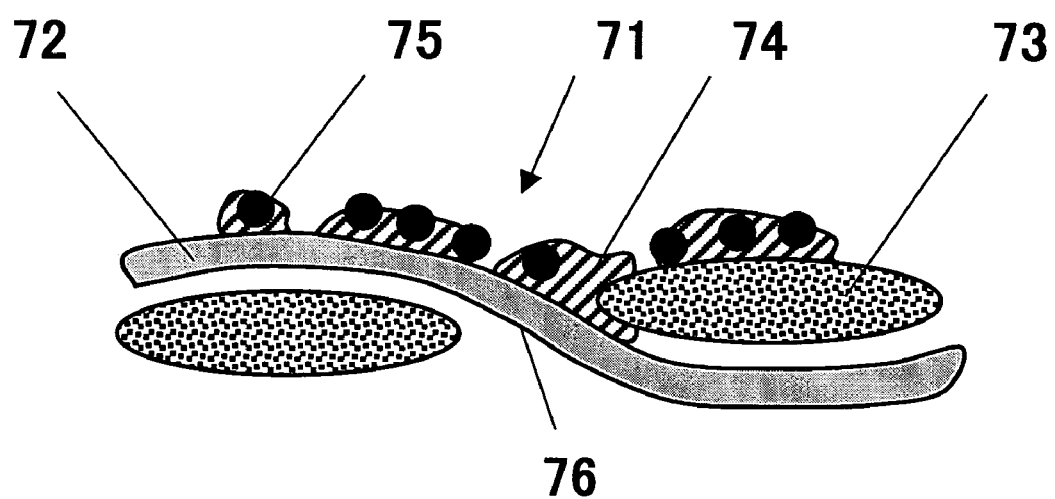
FIG. 7 is a typical vertical sectional view showing a still further mode of the carbon fiber reinforced substrate of the invention.

FIG. 7 is a typical vertical sectional view showing still further mode of the carbon fiber reinforced substrate of the invention. In FIG. 7, a carbon fiber reinforced substrate 71 comprises a fabric (bi-directional woven fabric) 76 comprising warp yarns 72 formed by carbon fiber bundles and weft yarns 73 formed by carbon fiber bundles, and a first resin 74 and a second resin 75 respectively adhering to the fabric 76. In the carbon fiber reinforced substrate 71, the second resin 75 adheres to the fabric in addition to the first resin 74, unlike the carbon fiber reinforced substrate 31 of FIG. 3. The second resin 75 adheres as particles relatively more densely on a surface of the fabric 76.

Figure 8:
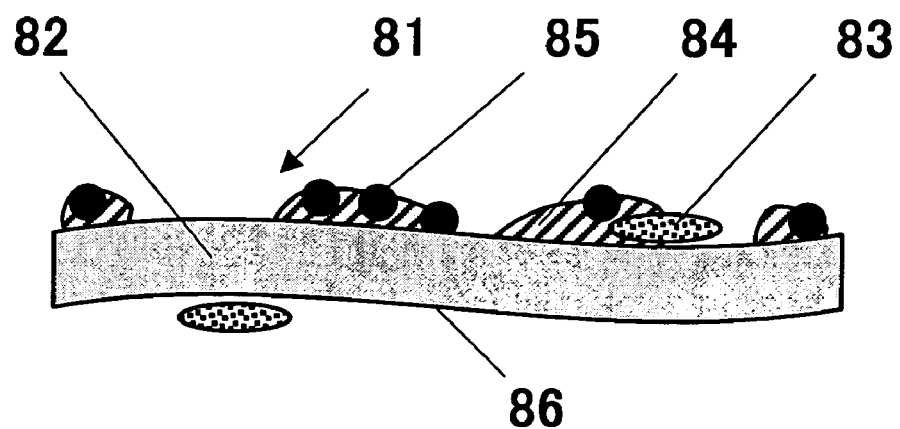
FIG. 8 is a typical vertical sectional view showing a still further mode of the carbon fiber reinforced substrate of the invention.

FIG. 8 is a typical vertical sectional view showing a still further mode of the carbon fiber reinforced substrate of the invention different from the mode of FIG. 7. In FIG. 8, a carbon fiber reinforced substrate 81 comprises a fabric (uni-directional woven fabric) 86 consisting of warp yarns 82 formed by carbon fiber bundles and auxiliary weft yarns 83 formed by auxiliary fiber bundles, and a first resin 84 and a second resin 85 respectively adhering to the fabric 86. In the carbon fiber reinforced substrate 81, the second resin 85 adheres to the fabric in addition to the first resin 84, unlike the carbon fiber reinforced substrate 41 of FIG. 4. The second resin 85 adheres as particles relatively more densely on a surface of the fabric 86.

The second resin may adhere to the fabric by means of the first resin or may independently adhere to the fabric, but it is preferred that the second resin adheres to the fabric by means of the first resin. That is, the second resin can adhere to the fabric as integrated with the first resin or can independently adhere to the fabric without being integrated with the first resin. However, it is preferred that the second resin is integrated with the first resin as in the former case.

If the second resin is integrated with the first resin, it can reliably adhere on a surface of the fabric. Furthermore, if the second resin per se is made to directly adhere to the fabric, a temperature higher than the temperature used for making the first resin adhere is needed. On the contrary, if the second resin is made to adhere to the fabric by means of the first resin, the second resin can be made to adhere to the fabric at a lower temperature.

As a result, the production efficiency of the carbon fiber reinforced substrate can be enhanced. Furthermore, the second resin is not required to be adhesive. So, the second resin may be selected from a wider range of resins, and a resin capable of more highly exhibiting the mechanical properties can be selected.

Being integrated means that both the resins are not separated from each other. For example, a mere dry blend consisting of particles of the first resin and particles of the second resin cannot be referred to as an integrated state, since the respective resins are separate from each other.

In the case where the second resin integrated with the first resin adheres, if the second resin is not substantially compatible lo with the first resin, the chemical reactivity between the first resin and the second resin can be minimized. So, even if the first resin and the second resin are molten and mixed for integration, the rise of viscosity can be prevented to the maximum extent. Furthermore, since the selectable range of resins in terms of material and form for the second resin is less limited, the selectable range can be widened, and the mechanical properties (especially CAI) of the obtained composite can be further improved advantageously. From these points of view, it is preferred that the second resin is not substantially compatible with the first resin.

In the case where the first resin and the second resin are integrated with each other, it is preferred that the surfaces of the second resin particles are partially (preferably 50% or more of the total surface area, more preferably 90% or more) covered with the first resin. If the first resin and the second resin in this state adhere to the fabric, the second resin can be made to adhere to the fabric by means of the first resin more reliably compared with a case where a mere dry blend consisting of the first resin and the second resin (not integrated) is used.

For integrating the first resin and the second resin, both the resins can be molten and mixed for obtaining a mixture with a desired mode. As another method, both the resins can be mixed using a solvent capable of dissolving them, and the solvent can be removed for obtaining a mixture with a desired mode. In view of working environment, melt mixing is preferred. For melt mixing, an adequate apparatus such as a single-screw extruder, double-screw extruder, Banbury mixer, kneader or three-roll mill can be selectively used.

The form of the second resin is not especially limited, and any desired form, for example, a fabric such as a woven fabric, knitted fabric, nonwoven fabric or mattress, particles, discontinuous pieces or any combination of the foregoing can be employed. It is preferred to select a form suitable for the purpose of the composite, but in view of microscopic homogeneity, mechanical property improving effect and inhibition of water absorption, a form of particles (preferably spherical) or discontinuous pieces is most preferred.

In the case where the second resin has a form of particles, it is preferred that the average particle diameter is in a range from 1 to 500 μm, in order to uniformly disperse the particles on a surface of the fabric. A more preferred average particle diameter range is from 1 to 150 μm, and a further more preferred range is 3 to 100 µm. If the average particle diameter is less than 1 µm, more particles enter into the clearances between the carbon filaments of the carbon fiber bundles constituting the fabric, and the amount of the particles adhering on the surface becomes small. If the average particle diameter is more than 150 µm, the number of the particles made to adhere per a predetermined weight of scattered particles becomes small since the particle diameter becomes large, and it may be difficult to scatter uniformly. The average particle diameter refers to the $D_{50}$ measured by the laser-diffraction scattering method. For the measurement, LMS-24 produced by Seishin Enterprise Co., Ltd. is used.

It is preferred that the water absorption coefficient of the second resin at 23° C. and 50 RH is 2.5 wt % or less. A more preferred water absorption coefficient is 1.8 wt %, and a further more preferred water absorption coefficient is 1.5 wt % or less. An especially preferred water absorption coefficient is 1.1 wt % or less. If the water absorption coefficient is more than 2.5 wt %, the composite obtained may not be excellent in mechanical properties (especially CHW). The water absorption coefficient refers to the value measured according to ASTM-D-570.

The second resin is not especially limited either like the first resin, if it is a resin capable of solving the problems of the invention. It is preferred that the main component of the second resin is a highly tough thermoplastic resin, and can be selected from the above-enumerated examples of the first resin. Above all, it is desirable to use at least one selected from the group consisting of polyamide resins, polyimide resins, polyamideimide resins, polyetherimide resins, polysulfone resins, polyether sulfone resins, polyphenylene ether resins, polyether ether ketone resins and polyether ketone ketone resins. Especially at least one selected from the group consisting of polyamide resins, polyamideimide resins, polyetherimide resins and polyether sulfone resins can easily exhibit the above-mentioned effects.

In the case where a polyamide is used as the main component of the second resin, it is preferred to use a homopolyamide such as polyamide 6, polyamide 66, polyamide 12, polyamide 610, polyamide 612, aromatic dicarboxylic acid or diamine such as isophthalic acid, terephthalic acid, paraxylenediamine or metaxylenediamine, alicyclic dicarboxylic acid or diamine such as dimethylbis (p-aminocyclohexyl)methane, or a copolyamide consisting of two or more of the foregoing.

Commercially available polyamides suitable for the second resin include Transparent Nylon T-714E, T-714H and T-600 respectively produced by Toyobo Co., Ltd., Trogamid T5000 and CX7323 respectively produced by Daicelhuls Ltd., Grilamid TR55 and TR90 respectively produced by EMS-Chemie, SP500 (particles) produced by Toray Industries, Inc., Genestar PA-9T produced by Kuraray Co., Ltd., etc.

It is preferred that the glass transition temperature of the polyamide measured by DSC is 100° C. or higher. More preferred is 125° C. or higher, and further more preferred is 150° C. or higher. The preferred polyamide has sufficient heat resistance when the composite is produced by molding, and can further enhance the effects (especially CAI) of using the second resin. In the meantime, for example, polyamide 12 exhibits a high effect of improving CAI, though it has a glass transition temperature of lower than 100° C. That is, it is preferred that a polyamide having a melting point has a glass transition temperature in a range from 30° C. to 280° C.

In the case where a thermoplastic resin is used as the second resin, if a thermosetting resin such as an epoxy resin is used as the first resin for making both the first resin and the second resin adhere integrally, both CAI and CHW can be enhanced to high levels. Furthermore, if a thermoplastic resin with a low melting point such as a polyamide resin with a low melting point is used as the first resin for making both the resins adhere integrally, CAI can be enhanced to an especially high level.

It is preferred that the second resin contains a thermosetting resin as a subsidiary component that can be selected from the above-enumerated examples of the first resin. Among them, an epoxy resin or phenol resin is preferred. If the subsidiary component covers the main component of the second resin or is at least partially (preferably wholly) converted to form a polymer alloy {preferably an interpenetrating polymer network (IPN)}, the chemical interaction with the third resin described later can be controlled. As a result, the above-mentioned effects (especially CAI) of using the second resin can be further enhanced. It exhibits preferred effects also in improving the chemicals resistance and heat resistance of the second resin and in inhibiting water absorption.

These effects can be especially remarkably exhibited in the case where a thermoplastic resin (especially a polyamide resin) is used as the second resin. In the case where a thermosetting resin is contained as a subsidiary component (especially when IPN is formed), it can happen that the second resin has neither the melting point nor the flow initiation temperature, but it is only required that the second resin is not molten or caused to flow at the melting point or flow initiation temperature of the first resin.

The preform of the invention has at least two layers of the above-mentioned carbon fiber reinforced substrate laminated, in which the layers of the carbon fiber reinforced substrate are integrally bonded by means of the first resin or the second resin.

If the bonding prevails on the entire surfaces of the carbon fiber reinforced substrate layers, it can happen that the handling properties of the preform become poor, and that the matrix resin permeation is prevented. The bonding is only required to be such that the laminated plural carbon fiber reinforced substrate layers can be handled integrally, and it is preferred that the substrate layers are partially bonded to each other.

Instead of laminating layers of a carbon fiber reinforced substrate, carbon fiber reinforced substrates different in the amount of the first resin or the second resin adhering to the fabric may also be laminated. Especially in the case of a preform produced by the RTM process using a male mold half and a female mold half, or in the case of a preform used for vacuum molding, in which a cavity formed by either a male mold half or a female mold half and a bag material is reduced in pressure to allow resin injection using the pressure difference between the reduced pressure and the atmospheric pressure, if carbon fiber substrates different in the amount of the first resin or the second resin adhering to the fabric are positively used, the passages of the third resin described later can be secured and controlled.

Figure 9:
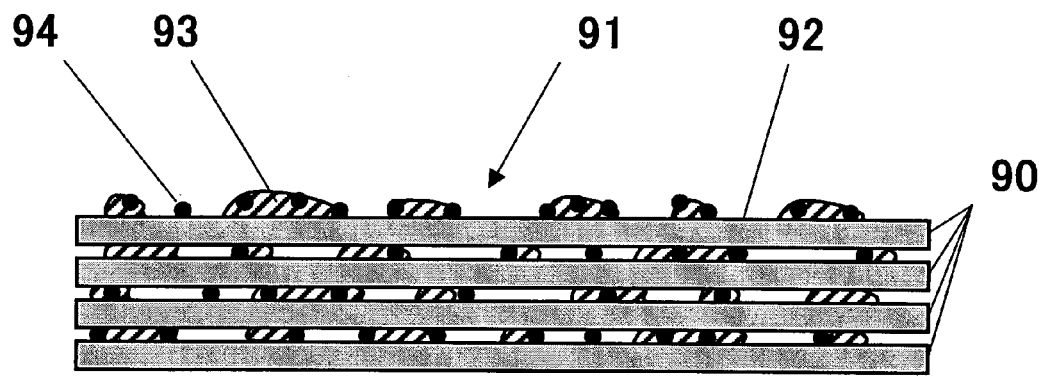
FIG. 9 is a typical vertical sectional view showing a mode of the preform of the invention.

This is explained more particularly in reference to a drawing. FIG. 9 is a typical vertical sectional view showing a mode of the preform of the invention. In FIG. 9, a carbon fiber reinforced substrate 90 of the invention, in which a first resin 93 and a second resin 94 relatively more densely adhering on the surfaces of respective fabrics 92 consisting of carbon fiber bundles, is a laminate consisting of four layers. The four layers of the carbon fiber reinforced substrate 90 are bonded to each other by means of the first resin 93 or the second resin 94, to form a preform 91. The preform 91 is a dry preform, in which the four layers of the carbon fiber reinforced substrate 90 are integrated, and the bulk volume fraction of fibers is minimized owing to the interlaminar bonding by means of the first resin 93 or the second resin 94. Therefore, the preform 91 is excellent in handling properties.

The composite of the invention is obtained by a method of impregnating the formed preform with a third resin used as a matrix resin different from the first resin, and subsequently solidifying the resin. The third resin permeated into the preform is solidified (cured or polymerized). The solidification of the third resin results in forming the composite.

Figure 10:
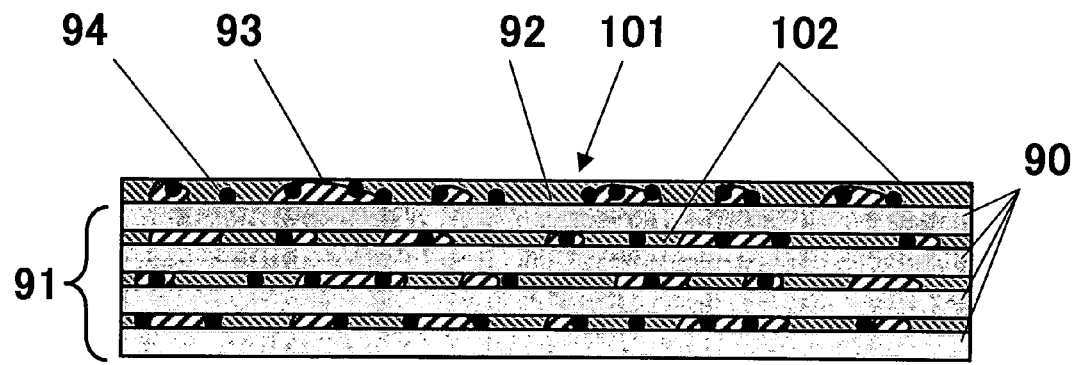
FIG. 10 is a typical vertical sectional view showing a mode of the composite of the invention.

This is explained more particularly in reference to a drawing. FIG. 10 is a typical vertical sectional view showing a mode of the composite of the invention. In FIG. 10, the clearances between the layers of the carbon fiber reinforced substrate 90 laminated in the preform 91 shown in FIG. 9 are impregnated with a third resin 102 that is then cured or polymerized for solidification to form a composite 101.

The third resin 102 is not especially limited like the first resin 93, if it is a resin capable of solving the problems of the invention, but a thermosetting resin is preferred in view of moldability and mechanical properties. It can be selected from the above-enumerated examples of the first resin. However, unlike the first resin, in the case where injection molding is used, the third resin must be a liquid at the injection temperature.

It is preferred that the thermosetting resin as the third resin is at least one selected from the group consisting of epoxy resins, phenol resins, vinyl ester resins, unsaturated polyester resins, cyanate ester resins, bismaleimide resins and benzoxazine resins, since the problems of this invention can be easily solved. Furthermore, resins containing an elastomer, rubber, curing gent, curing accelerator, catalyst or the like can also be used. Above all, to achieve, for example, very high mechanical properties (especially CAI and CHW) required for primary or principal structure elements of aircraft, an epoxy resin or bismaleimide resin is preferred. Especially an epoxy resin is preferred.

Since the third resin and the first resin are used respectively for different functions, it is desirable to use resins at least partially different from each other. That is, it is preferred to use a rein excellent in permeability (having a low viscosity at the injection temperature and a long gelation time) and excellent in mechanical properties as the third resin, and to use a resin capable of improving the handling properties of the fabric and imparting high mechanical properties as the first resin. Of course, the first resin and the third resin can contain a component common to them without any problem, and it may be preferred in view of the compatibility between both.

In the case where the third resin 102 is impregnated into the preform 91 in the injection or infusion molding described later, if the third resin has a low viscosity, the molding cycle can be shortened since the resin can be easily impregnated. It is preferred that the viscosity at the injection temperature is 400 mpa.s or less. More preferred is 200 mPa.s or less. It is preferred that the injection temperature is 100° C. or lower, since simple equipment can be used.

The composite can be obtained by any of various molding methods such as injection or infusion molding (TRM, RFI, RIM, vacuum molding, etc.) and press molding, or a combination of such molding methods.

A more preferred molding method for obtaining the composite is an injection molding method with high productivity such as RTM. In one of RTM methods, a resin is injected under pressurization into a cavity formed by a male mold half and a female mold half. In this case, it is preferred that the cavity is reduced in pressure for resin injection. Another preferred molding method is a vacuum molding method. In vacuum molding, for example, a cavity formed by either a male mold half or a female mold half and a bag material such as a film, particularly, a nylon film, silicone rubber or the like, is reduced in pressure, and the pressure difference between the reduced pressure and the atmospheric pressure is used for injecting a resin. In this case, it is preferred to dispose a resin distribution medium on the preform in the cavity for accelerating resin permeation, and to separate the medium from the composite after completion of molding. These particular molding methods can be used preferably in view of molding cost.

The applications of the composite of the invention are not especially limited. Since the composite has excellent mechanical properties (especially CAI and CHW), it exhibits its effects to the maximum extent, if it is used as a primary or principle structure element, secondary structure element, exterior element, interior element or any of parts thereof in transport machines such as aircrafts, motor vehicles and ships.

Figure 11:
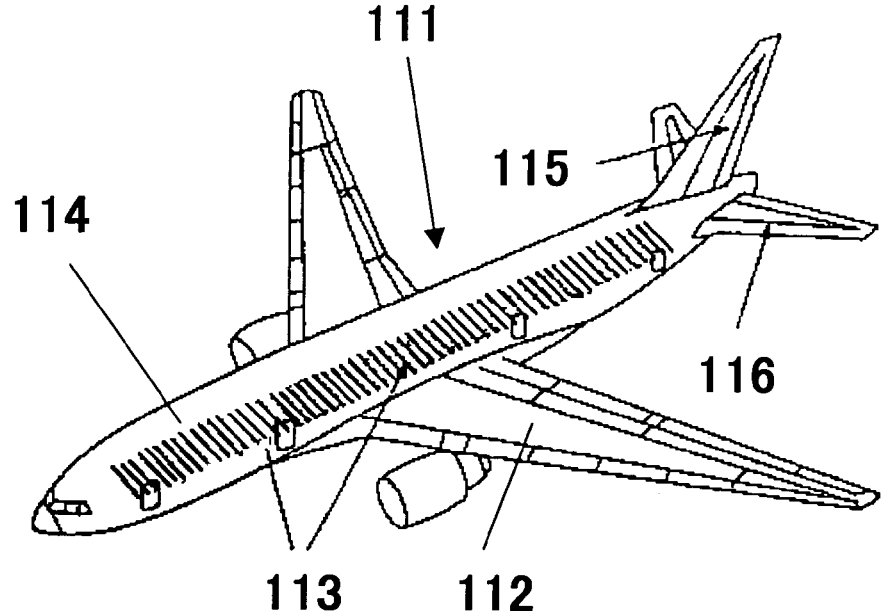
FIG. 11 is a schematic perspective view showing primary structure elements of an aircraft.

FIG. 11 is a schematic perspective view showing primary structure elements of an aircraft. In FIG. 11, an airplane 111 consists of various structure elements such as main wings 112, keel beams 113, fuselage 114, vertical fin 115 and horizontal stabilizers 116. If the composite obtained by a method of impregnating a preform composed of the carbon fiber reinforced substrate of the invention with a matrix resin and molding it is used, a structure element having excellent mechanical properties (especially CAI and CHW) can be produced at high productivity.

Figure 12:
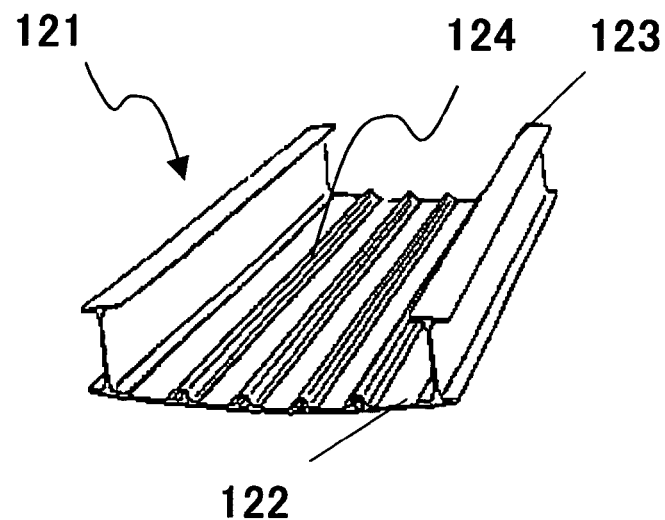
FIG. 12 is a schematic perspective view showing an example of a structural element in which the composite of the invention is applied.
Figure 13:
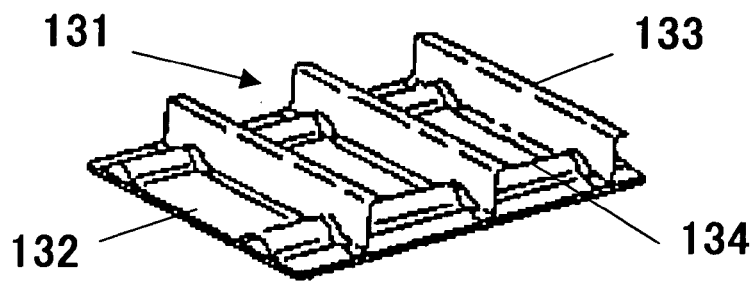
FIG. 13 is a schematic perspective view showing another example of a structural element in which the composite of the invention is applied.

FIG. 12 is a schematic perspective view showing an example of a structural element in which the composite of the invention is applied. FIG. 13 is a schematic perspective view showing another example of a structural element in which the composite of the invention is applied. In FIG. 12, a structure element 121 is composed of skins 122, beams 123 and ribs 124. In FIG. 13, a structure element 131 is composed of skins 132, beams 133 and ribs 134. In conventional structure elements, the skins 122 and 132, spars 123 and 133 and stiffeners 124 and 134 are respectively molded separately, and they are joined by means of rivets or adhesive, to produce the intended structure elements. However, in the composite of the invention, the skins, beams and ribs can be integrally molded, to greatly reduce the molding cost of structure elements.

The invention will be explained further with examples. In the examples, the following raw materials were used.

Carbon fiber bundles A: PAN-system carbon fibers, each bundle consisting of 24,000 filaments, and having a fineness of 1,000 tex, a tensile strength of 5830 MPa, a tensile modulus of 294 GPa and a fracture strain energy of 58 MJ/m$^3$.

Carbon fiber bundles B: PAN-system carbon fibers, each bundle consisting of 12,000 filaments, and having a fineness of 800 tex, a tensile strength of 4,900 MPa, a tensile modulus of 235 GPa and a fracture strain energy of 52 MJ/m$^3$.

Carbon fiber bundles C: PAN-system carbon fibers, each bundle consisting of 6,006 filaments, and having a fineness of 396 tex, a tensile strength of 3,530 MPa, a tensile modulus of 235 GPa and a fracture strain energy of 27 MJ/m$^3$.

Glass fiber bundles: ECE225 1/0 1Z, each bundle having a fineness of 22.5 tex and using type "DP" binder (produced by Nitto Bouseki Co., Ltd.).

First resin A: A resin composition obtained by hotmelt-kneading 60 wt % of a polyether sulfone resin (finely ground "Sumika Excel" 5003P produced by Sumitomo Chemical Co., Ltd.) and 40 wt % of an epoxy resin (AK-601 produced by Nippon Kayaku Co., Ltd.) using a double-screw extruder, having a glass transition temperature of 75° C.

First resin B: An epoxy resin ("Epikote" 1004AF produced by Japan Epoxy Resin Co., Ltd.), having a flow initiation temperature of 100° C.

First resin C: An epoxy resin (PT500 produced by 3M).

Second resin: Spherical particles obtained by converting 90 wt % of a polyamide resin ("Grilamide" TR55 produced by EMS-Showa Denko K.K., having a glass transition temperature of 162° C.) and 10 wt % of an epoxy resin and a curing agent into a polymer alloy (IPN). Average particle size ($D_{50}$) measured by the laser-diffraction scattering method is 13 μm.

Third resin: A liquid epoxy resin composition obtained by adding 32 parts by weight of the following curing solution to 100 parts by weight of the following main solution preheated to 70° C. and stirring till the mixture became homogeneous. The viscosity at 70° C. measured using Model E viscometer is 250 mPa.s.

Main solution: 30 parts by weight of "Araldite(R)" MY-721 produced by Vantico Inc., 20 parts by weight of "Epikote" 825 produced by Japan Epoxy Resins Co., Ltd., 20 parts by weight of AK-601 produced by Nippon Kayaku Co., Ltd., 30 parts by weight of "Epiclon(R)" HP-7200L produced by Dainippon Ink and Chemicals, Inc., and 1.4 parts by weight of n-propyl p-toluenesulfonate as a curing accelerator were respectively weighed and stirred at 100° C., till the mixture became homogeneous.

Curing solution: 18.1 parts by weight of "Epikure" W produced by Japan Epoxy Resins Co., Ltd. as an aromatic polyamine, 7.2 parts by weight of 3,3'-diaminodiphenylsulfone produced by Mitsui Kagaku Fine Chemicals, Inc. and 7.2 parts by weight of "Sumicure" S produced by Sumitomo Chemical Co., Ltd. were respectively weighed and stirred at 90° C., till the mixture became homogeneous.

EXAMPLE 1

The first resin A was freeze-crushed into particles. The average particle size $D_{50}$ of the particles was 124 μm.

Using the carbon fiber bundles A as warp yarns and glass fiber bundles as auxiliary weft yarns, a uni-directional woven fabric A was formed. The woven fabric A was a plain weave, and had a thickness of 0.3 mm, a carbon fiber unit weight of 295 g/m$^2$, 2.8 warp ends/cm and 3 weft ends/cm. The obtained uni-directional woven fabric A was 3.5 mm in the width of each carbon fiber bundle used as a warp yarn and more than 10 in the ratio of the width to the thickness of the carbon fiber bundle, and was a flat woven fabric. Before weaving, each of the carbon fiber bundles A had a width of 5.8 mm and a thickness of 0.15 mm.

The particles of the first resin A were allowed to naturally drop to coat the obtained uni-directional woven fabric A through a vibration net for uniform dispersion, while they were weighed using an emboss roll and a doctor blade. In this coating, 100 parts by weight of the woven fabric were coated with 10 parts by weight of the first resin. Furthermore, while the coated fabric was heated in a range from 180 to 200° C. using a far infrared heater, metallic touch rollers treated to allow releasing were used to pressurize the fabric, for letting the particles of the first resin A adhere to the uni-directional woven fabric A, which was then cooled and taken up as a carbon fiber reinforced substrate A. In this example, the process from the weaving step including a weaving machine to the cooling step was carried out in the same line continuously. The obtained carbon fiber reinforced substrate A had a thickness of 0.36 mm, an air permeability of 23.7 cm$^3$/cm$^2$·sec, and a cover factor of 99%.

EXAMPLE 2

Fifty parts by weight of the first resin B and 50 parts by weight of the second resin were melt-kneaded at 170° C. using a kneader, and freeze-ground, to obtain particles consisting of both the resins integrated. The average particle diameter $D_{50}$ of the particles was 38 μm. The second resin was not molten or did not flow at the flow initiation temperature of the first resin B, and both the resins were not compatible with each other.

The obtained particles were electrically charged using "Tricomatic (R)" II powder coating system produced by Nordson Corporation, while being uniformly dispersed by means of compressed air, to be applied to the uni-directional woven fabric A obtained as described in Example 1. In this coating, 100 parts by weight of the woven fabric were coated with 14 parts by weight of the particles. Furthermore, the coated fabric was heated in a range from 140 to 160° C., using a hot press roller, for letting the particles adhere to the uni-directional woven fabric A, which was then cooled and taken up as a carbon fiber reinforced substrate B. In this example, the process from the weaving step to the coating, bonding and cooling steps was carried out in different lines discontinuously. The particles were more uniformly dispersed on the uni-directional woven fabric A than those of Example 1, showing that the coating and bonding methods of Example 2 were more excellent than those of Example 1.

EXAMPLE 3

The carbon fiber bundles A were used as warp yarns, and glass fiber bundles were respectively covered with a nylon yarn with a low melting point ("Elder" produced by Toray Industries, Inc., 6 tex) for use as auxiliary weft yarns, to form a uni-directional woven fabric C. The woven fabric C was a plain weave, and had a thickness of 0.26 mm, a carbon fiber unit weight of 193 g/m$^2$, 1.8 warp ends/cm and 3 weft ends/cm. The woven fabric C was 5.5 mm in the width of each carbon fiber bundle used as a warp yarn and more than 20 in the ratio of the width to the thickness of the carbon fiber bundle, and was a woven fabric flatter than the uni-directional woven fabric A of Example 1. A carbon fiber reinforced substrate C was obtained as described for Example 1, except that the woven fabric C was used and that 100 parts by weight of the woven fabric C were coated with 14 parts by weight of the first resin A. The obtained carbon fiber reinforced substrate C had a thickness of 0.37 mm, an air permeability of 72.0 cm$^3$/cm$^2$·sec, and a cover factor of 93%.

EXAMPLE 4

A bi-directional woven fabric D was woven using the carbon fiber bundles B as warp yarns and weft yarns. The woven fabric D was a plain weave, and had a thickness of 0.19 mm, a carbon fiber unit weight of 19.3 g/m$^2$, 1.21 warp ends/cm, and 1.21 warp ends/cm. A carbon fiber reinforced substrate D was obtained as described for Example 1, except that the woven fabric D was used and that 100 parts by weight of the woven fabric D were coated with 5 parts by weight of the first resin A. The obtained carbon fiber reinforced substrate D had a thickness of 0.24 mm, an air permeability of 15.6 cm$^3$/cm$^2$·sec, and a cover factor of 99%.

EXAMPLE 5

The carbon fiber reinforced substrate A and the carbon fiber reinforced substrate B were respectively cut to have a length of 340 mm and a width of 340 mm. For each substrate, a stack architecture of [−45°/0°/+45°/90°] was repeated twice to form a set, and another identical set was also fabricated. Both the sets were stuck to each other with the 90° C. layers facing each other, to provide a symmetric cross-ply laminate of each substrate. The laminate was placed in a plate mold, and a sealant and a bag material (polyamide film) were used for sealing to form a cavity. The cavity was provided with a suction port for evacuation. A vacuum pump was used for evacuating the cavity from the suction port, to reduce the pressure to vacuum in the cavity, and the preform mold was adjusted to 80° C. The laminate was kept in this state for 1 hour and cooled to room temperature, and the suction was stopped. In this way, a quasi-isotropic preform A and a quasi-isotropic preform B were obtained.

EXAMPLE 6

The carbon fiber reinforced substrate C and the carbon fiber reinforced substrate D were used. A stack architecture as stated in Example 5 was repeated three times to form a set. Another identical set was also fabricated. Both the sets were stuck to each other to provide a symmetrical cross-ply laminate. A pressure of 150 kPa was applied to the laminate at 130° C. using a press machine containing a preform mold for 5 minutes, and in succession with the pressure kept as it was, the laminate was cooled to room temperature and depressurized. In this way, a quasi-isotropic preform C and a quasi-isotropic preform D were obtained.

EXAMPLE 7

A uni-directional preform A, a uni-directional preform B and a uni-directional preform C were obtained as described for Example 5, except that four layers of a stack architecture of [0°] were used for the carbon fiber reinforced substrate A and the carbon fiber reinforced substrate B, and six layers of a stack architecture of [0°] were used for the carbon fiber reinforced substrate C.

EXAMPLE 8

Any of the quasi-isotropic preform A, the quasi-isotropic preform B, the quasi-isotropic preform C, the quasi-isotropic preform D, the uni-directional preform A, the uni-directional preform B and the uni-directional preform C was placed in a 80° C. mold, and a resin distribution medium (34-mesh wire net) was placed on the preform. Then, a sealant and a bag material (polyamide film) were used for sealing to form a cavity. The cavity was provided with a resin injection port and a suction port for evaluation. A vacuum pump was used for evacuating the cavity through the suction port, to reduce the pressure to vacuum in the cavity, and the mold and the preform were adjusted to 80° C. Then, the third resin, preliminarily prepared and vacuum-degassed, was injected from the resin injection port using the atmospheric pressure, while being kept at 80° C. When the third resin reached the suction port for evacuation, the resin injection port was closed to stop the resin injection. Thereafter, while the cavity was continuously evacuated by the vacuum pump from the suction port, the third resin impregnated into the preform was cured with the temperature kept at 180° C. for 2 hours. In this way, a quasi-isotropic plate A, a quasi-isotropic plate B, a quasi-isotropic plate C, a quasi-isotropic plate D, a uni-directional plate A, a uni-directional plate B and a uni-directional plate C were obtained.

The volume fraction of carbon fibers Vf in the quasi-isotropic plate A was 54 vol %; the volume fraction of carbon fibers Vf in the quasi-isotropic plate B, 56 vol %; the volume fraction of carbon fibers Vf in the quasi-isotropic plate C, 55 vol %; and the volume fraction of carbon fibers Vf in the quasi-isotropic plate D, 53 vol %.

The volume fraction of carbon fibers Vf in the uni-directional plate A was 55 vol %; the volume fraction of carbon fibers Vf in the uni-directional plate B, 56 vol %; and the volume fraction of carbon fibers Vf in the uni-directional plate C, 56 vol %.

These composites were quite free from pinholes and voids, and it was demonstrated that good molding was carried out.

From each of the obtained quasi-isotropic plate A, quasi-isotropic plate B, quasi-isotropic plate C and quasi-isotropic plate D, a 152 mm long×102 mm wide plate was cut out as a coupon. A weight of 5.44 kg (12 lbs) was dropped to the center of the coupon, to give a drop weight impact of 6.67 kJ/m (1500 in·lb/in), and the compression strength after impact (CAI) was measured.

Furthermore, from each of the obtained uni-directional plate A, uni-directional plate B and uni-directional plate C, a coupon in accordance with SACMA SRM 1R-94 was obtained. The coupon was immersed in 70° C. water for 14 days (hot-wet conditioning), and immediately the 0° compression strength of the coupon at evaluated temperature (82° C.) (CHW) was measured. Furthermore, the 0° compression strength of the coupon of either the uni-directional plate A or the uni-directional plate C at room temperature (CS), not subjected to hot-wet conditioning, was also measured.

Moreover, from each of the uni-directional plate A, the uni-directional plate B and the uni-directional plate C, a coupon in accordance with SACMA SRM 4R-94 was obtained. The 0° tensile strength of the coupon at room temperature (TS) was measured.

COMPARATIVE EXAMPLE 1

The uni-directional woven fabric A produced as described for Example 1, except that the first resin A was not caused to adhere, was used as a carbon fiber reinforced substrate E.

COMPARATIVE EXAMPLE 2

The carbon fiber bundles C were used as warp yarns and the glass fiber bundles were used as auxiliary weft yarns, to form a uni-directional woven fabric F. The woven fabric F was a plain weave, and had a thickness of 0.2 mm, a carbon fiber unit weight of 193 g/m$^2$, 4.87 warp ends/cm and 3 weft ends/cm. A carbon fiber reinforced substrate F was obtained as described for Example 1, except that 100 parts by weight of the woven fabric F were coated with 5 parts by weight of the first resin C.

COMPARATIVE EXAMPLE 3

A quasi-isotropic preform E, a quasi-isotropic preform F, a uni-directional preform E and a uni-directional preform F were respectively obtained, as described for processing the carbon fiber reinforced substrate A and the carbon fiber reinforced substrate C, except that the carbon fiber reinforced substrate E and the carbon fiber reinforced substrate F were used.

COMPARATIVE EXAMPLE 4

A quasi-isotropic plate E, a quasi-isotropic plate F, a uni-directional plate E and a uni-directional plate F were respectively molded as described for Example 8, for testing, except that the quasi-isotropic preform E, the quasi-isotropic preform F, the uni-directional preform E and the uni-directional preform F were used. The volume fraction of carbon fibers Vf in the quasi-isotropic plate E was 59 Vol %, and the volume fraction of carbon fibers Vf in the quasi-isotropic plate F, 56 vol %. The volume fraction of carbon fibers Vf in the uni-directional plate E was 60 vol %, and the volume fraction of carbon fibers Vf in the uni-directional plate F, 56 vol %.

The results of the above are shown in Table 1.

TABLE 1

| Substrate | Properties of carbon fiber bundles Tensile modulus (GPa) Fracture strain energy (MJ/m$^3$) | Deposited amount of first resin (parts by weight) | Deposited amount of second resin (parts by weight) |
|---|---|---|---|
| A | 294 58 | 10 | Nil |
| B | 294 58 | 7 | 7 |
| C | 294 58 | 14 | Nil |
| D | 235 53 | 5 | Nil |
| E | 294 58 | Nil | Nil |
| F | 235 27 | 5 | Nil |

| Substrate | Handling properties of substrate | CAI (Mpa) (ksi) | CHW (Mpa) (ksi) | CS (Mpa) (ksi) | TS (Mpa) (ksi) |
|---|---|---|---|---|---|
| A | Good | 248 36 | 972 141 | 1428 207 | 2766 401 |
| B | Good | 276 40 | 1028 149 | — — | 2808 407 |
| C | Good | 282 41 | 952 138 | 1421 206 | 2966 430 |
| D | Good | 232 34 | — — | — — | — — |
| E | No good | 165 24 | 1041 151 | — — | 2738 397 |
| F | Good | 109 16 | 996 144 | — — | — — |

As can be seen from Table 1, the carbon fiber reinforced substrates A, B, C and D were easier to handle than the substrates produced using prepregs, owing to the first resin adhering to each woven fabric. They were very excellent in such handling properties as stiffness, form stability of woven fabric in terms of texture slippage and misalignment, portability and drapability. When they were formed into preforms, they exhibited excellent tackiness, and the carbon fiber reinforced substrate laminates obtained from them were not delaminated. Thus, strong bulky preforms could be obtained.

On the other hand, the carbon fiber reinforced substrate E devoid of the first resin was poor in handling properties, and since it was not tacky, the respective layers were delaminated, not allowing a bulky preform to be obtained.

In view of mechanical properties, the carbon fiber reinforced substrates A, B, C and D in conformity with the invention were remarkably higher in CAI, and yet not lower in CHW or TS than the carbon fiber reinforced substrate E. On the other hand, the carbon fiber reinforced substrate F not in conformity with the invention was very poor especially in CAI, being unsuitable for applications such as structure elements requiring high mechanical properties, even though it contained the first resin.

INDUSTRIAL APPLICABILITY

The invention can provide a composite good in matrix resin permeability and excellent in mechanical properties such as the compression strength after impact and the compression strength after hot-wet conditioning at high productivity. In addition, the invention can provide a carbon fiber reinforced substrate excellent in stiffness, form stability, drapability and tackiness in lamination, a preform formed by laminating layers of the substrate, and a composite obtained by impregnating the preform with a matrix resin.

The composite obtained like this is suitable as any of various elements such as a structure element, interior element and exterior element in such transport machines as aircrafts, motor vehicles and ships and other wide areas. It is especially suitable as a structure element of an aircraft.

The invention claimed is:

1. A carbon fiber reinforced substrate comprising a fabric composed of carbon fiber bundles and a first resin adhering to said fabric, wherein said carbon fiber bundles respectively comprise numerous continuous carbon filaments, the tensile modulus of said carbon fiber bundles is 210 GPa or more, and the fracture strain energy of said carbon fiber bundles is 40 MJ/m$^3$ or more, and wherein a main component of said first resin is a thermoplastic resin, the amount of said first resin adhering to said fabric is in a range from 1 to 20 parts by weight per 100 parts by weight of said fabric, said first resin is adhered relatively more densely on a surface of said fabric than in the inside of said carbon fiber bundles, and said first resin is studded discontinuously on the surface of said fabric, and further wherein air permeability of said carbon fiber reinforced substrate is in a range from 10 to 200 cm3/cm2·sec.

2. The carbon fiber reinforced substrate according to claim 1, wherein the amount of said first resin is in a range from 1 to 10 parts by weight per 100 parts by weight of said fabric.

3. The carbon fiber reinforced substrate according to claim 1, wherein said tensile modulus of said carbon fiber bundles is in a range from more than 280 to less than 500 GPa, and the fracture strain energy of said carbon fiber bundles is 53 MJ/m$^3$ or more.

4. The carbon fiber reinforced substrate according to claim 1, wherein said fabric is a uni-directional woven fabric, bi-directional woven fabric or uni-directional sheet, the carbon fiber unit weight of the carbon fiber substrate is in a range from 50 to 500 g/m$^2$, and the thickness of the carbon fiber substrate is in a range from 0.1 to 0.8 mm.

5. The carbon fiber reinforced substrate according to claim 1, wherein diameters of studded pieces of said first resin are 1 mm or less.

6. The carbon fiber reinforced substrate according to claim 1, wherein said first resin adheres on a surface of said fabric, and the average thickness of the first resin adhering on the surface is in a range from 5 to 250 μm.

7. The carbon fiber reinforced substrate according to claim 1, wherein the melting point or flow initiation temperature of said first resin is in a range from 50 to 150° C.

8. The carbon fiber reinforced substrate according to claim 1, wherein the amount of said thermoplastic resin is in a range from 70 to 100 wt % based on the weight of said first resin.

9. The carbon fiber reinforced substrate according to claim 1, wherein the main component of said first resin is at least one selected from the group consisting of polyamide resins, polyetherimide resins, polyphenylene ether resins, polyether sulfone resins, phenoxy resins and polyimide resin.

10. The carbon fiber reinforced substrate according to claim 1, wherein a second resin higher in melting point or flow initiation temperature than said first resin and being not substantially compatible with said first resin is adhered to said fabric and the amount of said second resin is in a range from 1 to 10 parts by weight per 100 parts by weight of said fabric.

11. The carbon fiber reinforced substrate according to claim 1, wherein the amount of a second resin neither molten nor caused to flow at the melting point or flow initiation temperature of said first resin and adhering to said fabric is in a range from 1 to 10 parts by weight per 100 parts by weight of said fabric.

12. The carbon fiber reinforced substrate according to claim 10 or 11, wherein said second resin adheres on a surface of said fabric by means of said first resin.

13. The carbon fiber reinforced substrate according to claim 10 or 11, wherein said second resin comprises particles with an average particle diameter of 1 to 500 μm.

14. The carbon fiber reinforced substrate according to claim 10 or 11, wherein a main component of said second resin is a thermoplastic resin.

15. The carbon fiber reinforced substrate according to claim 14, wherein the main component of said second resin is at least one thermoplastic resin having a glass transition temperature of 30 to 280° C. selected from the group consisting of polyamide resins, polyamideimide resins, polyetherimide resins and polyether sulfone resins.

16. A perform comprising a laminate comprising at least two or more layers of the carbon fiber reinforced substrate as set forth in any one of claims 1, 2, 3, 4, 5, 6, 7, 8, 9, 10, and 11, wherein the layers of the carbon fiber reinforced substrate are integrally bonded to each other by means of said first resin.

17. The composite comprising at least the preform as set forth in claim 16 and a third resin, wherein said preform is impregnated with a third resin different from said first resin.

18. The composite according to claim 17, which is any one of a primary structure element, secondary structure element, exterior element, interior element and parts forming those elements in an aircraft, a motor vehicle or a ship.

* * * * *